F. H. STANWOOD.
FOOT REST FOR USE IN CONNECTION WITH AUTOMOBILE ACCELERATORS.
APPLICATION FILED APR. 20, 1917.
1,410,351. Patented Mar. 21, 1922.
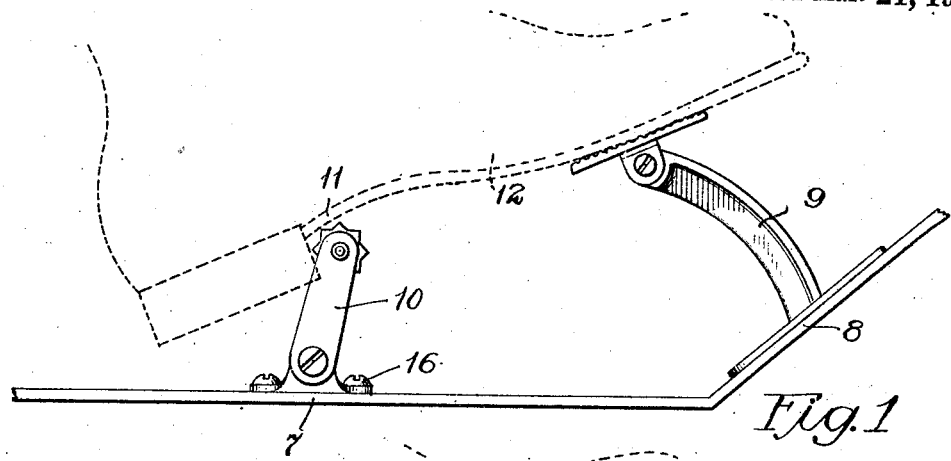
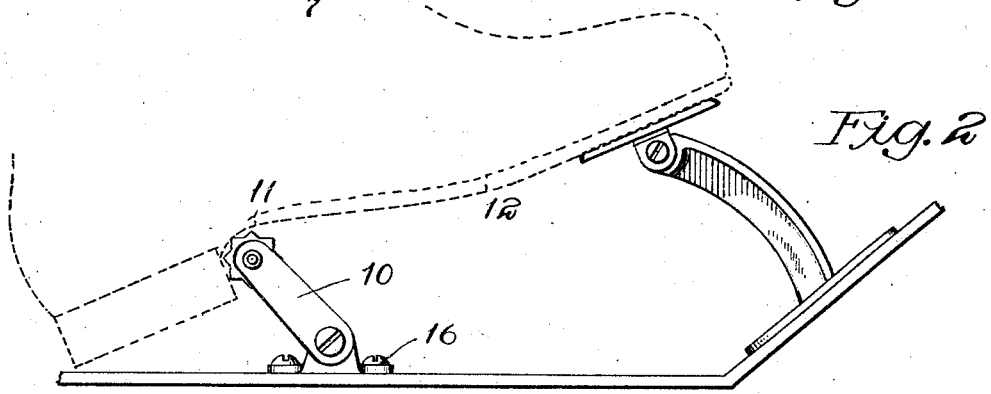
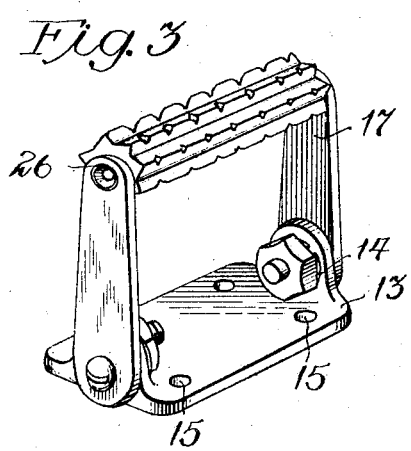
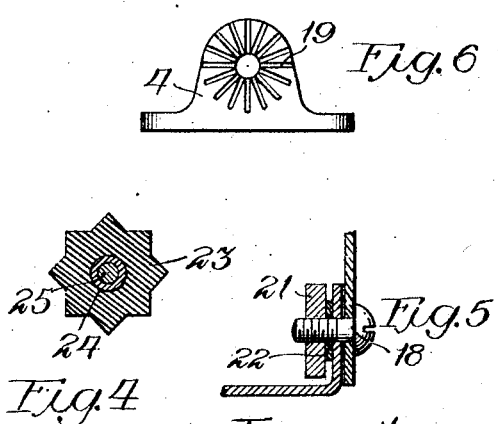
Witness:
Chas. R. Koursh.
J. J. O'Brien.
Inventor
Frank H. Stanwood.
By: Munday, Evarts, Adcock & Clarke, Attys

UNITED STATES PATENT OFFICE.

FRANK H. STANWOOD, OF CHICAGO, ILLINOIS, ASSIGNOR TO STANWOOD EQUIPMENT CO., OF BOSTON, MASSACHUSETTS, A CORPORATION OF MAINE.

FOOT REST FOR USE IN CONNECTION WITH AUTOMOBILE ACCELERATORS.

1,410,351.   Specification of Letters Patent.   Patented Mar. 21, 1922.

Application filed April 20, 1917. Serial No. 163,357.

*To all whom it may concern:*

Be it known that I, FRANK H. STANWOOD, a citizen of the United States, residing in Chicago, in the county of Cook and State of Illinois, have invented a new and useful Improvement in Foot Rests for Use in Connection with Automobile Accelerators, of which the following is a specification.

This invention relates in general to foot rests and has more particular reference to foot rests provided for use in connection with automobile accelerators and the like.

Usually the accelerator pedal of an automobile is positioned a substantial distance above the toe board or floor and the driver rests his toe lightly thereon. If the car or automobile encounters a sudden jolt, the toe presses in response upon the accelerator and causes the car to jump ahead without the intention of the driver.

A principal object of this invention is the provision of an accelerator support for the foot when the toe is resting upon the accelerator, which support will take up the jar and necessitate the driver to press upon the accelerator to move his foot from the natural position to actuate the accelerator.

A further object of this invention is the provision of such a rest which will be readily adjustable to different foot requirements and adjustable also in order that it may be installed in cars having the accelerator located in different positions, and this without the provision of special rests for different makes of automobiles.

A still further object of the invention is the provision of a rest having these and other advantages which may be cheaply manufactured, comfortable to use, and unlikely to become damaged or require repair or replacement.

Other objects and advantages of the invention will be apparent as it is better understood from the following description when considered in connection with the accompanying drawing illustrating a preferred embodiment thereof.

On the drawing,

Figure 1 is a partial sectional view of the floor and toe board of an automobile showing one relative arrangement of the foot rest and accelerator pedal;

Fig. 2 is the same view showing a different arrangement of the foot rest and accelerator pedal;

Fig. 3 is a perspective view of a foot rest;

Fig. 4 is a transverse section through the instep engaging part thereof;

Fig. 5 is a section through the connection between an arm and a base of said foot rest; and Fig. 6 is an end view of the base.

For the purpose of illustrating my invention I have shown on the drawing a part of the floor 7 of an automobile and a part also of a toe board 8. In the present instance the accelerator pedal, indicated at 9, is positioned to move through the toe board and this pedal may have any usual or preferred construction. The foot rest generally indicated at 10 is placed back of the pedal and where it can engage an instep 11 of a foot 12 when the toe of the foot is resting upon the pedal 9. This foot rest in the present instance is comprised of a base 13 having a pair of upstanding ears or lugs 14 and provided also with holes 15 to permit it to be fastened by screws or other means 16 to the floor. An arm 17 is pivoted in each ear 14 by holding bolts 18. The adjacent faces of the ears and arms are ribbed or kerfed as indicated at 19 in order that a tightening of the nut 21 of the bolt 18 may cause a firm interlocking. A spring washer 22 is preferably provided between the nut and the ear to hold the parts in tight relation without placing too much strain upon the threads of the bolt. The two arms 17 carrying a serrated ribbed rubber roll 23, in the present instance, this roll having a sleeve 24 through which a pintle or pivot 25 extends, the ends of this pivot being swaged or otherwise secured in openings through the ends of the arms as seen at 26. Figs. 1 and 2 show different positions of adjustment and in Fig. 2 it will be noted that the rest is adjusted to permit the heel of the driver to rest on the floor so that the foot is supported both by the floor and by the foot rest. When the car rides over a stone or other obstruction the jolt will be taken up by these two supports, the foot rest preventing the foot tilting forward to operate the accelerator.

In Fig. 1, the pressure of the foot is taken up entirely by the foot rest and in each instance it is necessary to depress the toe with respect to the ankle of the driver to actuate the accelerator, which is not an involuntary movement when the car is jolted.

The foot rest embodying my invention and just described possesses the further advantage in that it permits a direct and positive actuation of the accelerator without requiring a tilting movement of the foot. Accelerators are frequently provided to be actuated by resting an edge of the sole of the shoe on the toe-board or floor of the car with the other and opposite edge elevated and upon the accelerator. The foot must be tilted sidewise in such event to actuate the accelerator and such foot action is unnatural and tiring. Where the foot rest is provided, the toe is positively prevented from actuating the accelerator until the toe is tilted downwardly from the instep, the foot rest furnishing in this action an accurate manipulation of the accelerator pedal.

It is thought that the invention and many of its attendant advantages will be understood from the foregoing description, and it will be apparent that various changes may be made in the form, construction and arrangement of the parts without departing from the spirit and scope of the invention or sacrificing any of its material advantages, the form hereinbefore described being merely a preferred embodiment thereof.

I claim:

1. A foot rest for use in connection with automobile accelerators and the like comprising a base part, an arm extending up from the base part and with pivotal movement for adjustment toward and from the accelerator button, means for frictionally locking said arm in angularly adjusted relation, and a foot rest carried in said arm.

2. A foot rest for automobile accelerators and the like comprising a base and a revoluble cylinder disposed above the base and adapted for engagement with the instep of the foot held in position to actuate the accelerator or the like.

3. A foot rest for use in connection with automobile accelerators or the like, comprising a member for engaging the instep of the foot and holding it in position to actuate the accelerator or the like, and pivotally supported for adjustment toward and from the accelerator, the pivotal adjustment being adapted to be tightened to hold the rest in adjusted position.

4. A foot rest for use in connection with automobile accelerators and the like, comprising a base adapted to be secured to the floor of the car, an arm extending up from said base and having an adjustable pivotal connection therewith and carrying a roller adapted to engage in the instep of a foot held in position to operate the accelerator or the like.

5. A foot rest for use in connection with automobile accelerators and the like, comprising a base, a pair of arms extending up from the base, and pivotally connected therewith, a part adapted to engage in the instep of a foot held to operate the accelerator or the like, said arms and said base being relatively adjustable and held in interlocked position after adjustment.

6. A foot rest for use in connection with automobile accelerators and the like, comprising an upwardly extending pair of arms and a roller held therebetween and arranged for engagement in the instep of the foot of the user.

7. A foot rest for use in connection with automobile accelerators and the like, comprising an upwardly extending pair of arms and a roller of yielding material held therebetween and arranged for engagement in the instep of the foot of the user.

Signed in the presence of two subscribing witnesses.

FRANK H. STANWOOD.

Witnesses:
ETHEL WOOD,
M. EDNA BARRY.